United States Patent
Meyer et al.

[11] Patent Number: 6,153,281
[45] Date of Patent: Nov. 28, 2000

[54] MAGNETIC MEDIA WITH PERMANENTLY DEFINED NON-MAGNETIC TRACKS AND SERVO-PATTERNS

[75] Inventors: Dallas W. Meyer, Burnsville; Zine-Eddine Boutaghou, Owatonna, both of Minn.; Bo Wei, Santa Clara, Calif.

[73] Assignee: Seagate Technology LLC, Scotts Valley, Calif.

[21] Appl. No.: 09/025,365

[22] Filed: Feb. 18, 1998

Related U.S. Application Data

[62] Division of application No. 08/757,850, Nov. 27, 1996, Pat. No. 5,858,474.
[60] Provisional application No. 60/011,876, Feb. 20, 1996.
[51] Int. Cl.$^7$ ...................................................... G11B 5/66
[52] U.S. Cl. .............. 428/65.3; 428/694 T; 428/694 TR; 428/694 BR; 428/694 TS; 428/141; 428/900
[58] Field of Search ................................ 428/65.3, 694 T, 428/694 TR, 694 BR, 694 TS, 900, 141

[56] References Cited

U.S. PATENT DOCUMENTS

| | | | |
|---|---|---|---|
| 3,258,750 | 6/1966 | Shew ..................................... | 360/77.01 |
| 3,593,331 | 7/1971 | Connell et al. .......................... | 360/135 |
| 3,753,252 | 8/1973 | Tietze ................................. | 340/174.1 G |
| 4,783,705 | 11/1988 | Moon et al. .......................... | 360/77.08 |
| 4,802,050 | 1/1989 | Miyabayashi et al. .................. | 360/135 |
| 5,193,034 | 3/1993 | Tsuyoshi et al. ........................ | 360/51 |
| 5,210,672 | 5/1993 | Ivers et al. ............................. | 360/135 |
| 5,278,703 | 1/1994 | Rub et al. ................................. | 360/51 |
| 5,350,618 | 9/1994 | Togawa et al. .......................... | 428/156 |

*Primary Examiner*—Leszek Kiliman
*Attorney, Agent, or Firm*—Kinney & Lange, P.A.

[57] ABSTRACT

A magnetic medium has permanently defined boundaries between tracks and a consistent surface smoothness. The crystallographic structure of the magnetic medium is modified at the track boundaries, so the grains of the magnetic thin film permanently take on a relatively non-magnetic structure as compared to the grains of the magnetic thin film within the tracks. Servo patterns on the magnetic medium may be permanently defined at the same time the track boundaries are permanently defined. Laser ablation, laser heating to an amorphous structure, photolithography, perpendicular deposition, ion milling, reverse sputtering, and ion implantation can be used individually or in combination, with either the magnetic layer or the underlayer, to create the relatively non-magnetic areas.

19 Claims, 6 Drawing Sheets

MAGNETIC MEDIA WITH PERMANENTLY DEFINED NON-MAGNETIC TRACKS AND SERVO-PATTERNS

This application is a divisional of application Ser. No. 08/757,850, filed Nov. 27, 1996, now U.S. Pat. No. 5,858,474. This application claims the benefit of provisional application No. 60/011,876 filed on Feb. 20, 1996, entitled "Ultra-High Performance "Perm-Disk" without the Mechanical Performance Penalties".

BACKGROUND OF THE INVENTION

The present invention relates generally to magnetic media for recording information, and, more particularly, to disc drives with magnetic head assemblies which record information in tracks on thin film discs.

The computer industry continually seeks to reduce the size of computer components and to increase the speed at which computer components operate. To this end, it is desired to reduce the size required to magnetically record bits of information. It is concomitantly important to maintain the integrity of the information as size is decreased, and magnetic storage of information must be virtually 100% error free. The present invention seeks to address these goals in a disc drive.

Disc drives which magnetically record, store and retrieve information on disc-shaped media are widely used in the computer industry. A write transducer is used to record information on the disc, and a read transducer is used to retrieve information from the disc. The reading and writing processes may be performed by a single structure, i.e., a read-write transducer, or alternatively may be performed by separate structures. In either case, the read transducer and the write transducer are generally both located on a single magnetic head assembly.

The disc is rotated at relatively high speed, and the magnetic head assembly is mounted on the end of a support or actuator arm, which positions the head radially on the disc surface. If the actuator arm is held stationary, the magnetic head assembly will pass over a circular path on the disc known as a track, and information can be read from or written to that track. Each concentric track has a unique radius, and reading and writing information from or to a specific track requires the magnetic head to be located above the track. By moving the actuator arm, the magnetic head assembly is moved radially on the disc surface between tracks. Many actuator arms are rotary, wherein the magnetic head assembly is moved between tracks by activating a servomotor which pivots the actuator arm. A linear actuator may alternatively be used to move a magnetic head assembly inward or outward on the disc along a straight line.

Each magnetic head assembly is typically connected to its respective actuator arm by a flexure or "suspension" arm. The suspension arm functions as a bending spring to bias the magnetic head assembly toward the disc surface. The magnetic head assembly includes a portion known as a "slider". As the disc pack rotates at high speed, the aerodynamic properties of the slider cause the magnetic head assembly to "fly" above its respective disc surface. During use of the disc drive, the magnetic head is designed to fly over the disc surface without contacting the disc, although occasional contacts do happen.

Magnetic thin films are a particular type of magnetic media which are commonly used in computer applications. Thin film media typically consist of a layer or film of a magnetic substance deposited over a substrate. The magnetic substance may be a cobalt based alloy, and the substrate may be a nickel-phosphored aluminum or may be silicon or glass based. A relatively non-magnetic underlayer such as chromium may be used between the magnetic film and the substrate.

To enhance the durability of the disc, a protective layer of a very hard material is applied over the cobalt alloy film. A typical protective layer is an overcoat of sputtered amorphous carbon. The overcoat surface is usually lubricated to further reduce wear of the disc due to contact with the magnetic head assembly. Perfluoropolyethers (PFPEs) are currently the lubricant of choice for thin film recording media. The overcoat and lubricant while not performing a magnetic function, greatly affect the tribology between the disc and the read-write head, and are very useful in resisting wear of the disc surface which might otherwise be caused by the read-write head. The overcoat and lubricant also help the disc to resist corrosion. While the tribology between a slider and a disc is a function of the properties of the substrate and all the deposited layers, the overcoat and the lubricant are of primary importance. The slider structure also greatly affects the tribology, and sliders are usually formed of a fairly hard ceramic. To record information on the disc, the write transducer creates a highly concentrated magnetic field. During writing, the strength of the concentrated magnetic field directly under the write transducer is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc rotates, the direction of the writing magnetic field is alternated based on bits of the information being stored, thereby recording a magnetic pattern on the track directly under the write transducer.

Several parameters of the disc drive system are critical for higher storage densities. Higher coercivity and smaller transition size in the magnetic media lead to higher storage densities. The space necessary to record information in magnetic media is dependent upon the size of transitions between oppositely magnetized areas. The transition size narrows as coercivity is increased, because with high coercivity, the medium can resist the transition broadening due to the neighboring fields.

In thin films, crystalline anisotropy is the primary means of magnetization. Grains are more easily magnetized along the plane of the disc because the grains have a preferred crystalline orientation for magnetization lying along the plane. When applied as a thin film, the crystal structure of the magnetic layer depends firstly on the composition of the magnetic layer, but also depends on the deposition conditions and processes. Cobalt based alloys have been sputtered onto substrates with chromium underlayers to produce media with coercivities in the range of 1800–2900 Oersteds. The coercivities and media noise can be affected significantly by optimizing the deposition processes.

Coercivities and media noise can also be affected significantly by the composition and microstructure of the underlayer. The initial grain growth of the magnetic layer is dependent on the underlying grain structure of the underlayer. Chromium underlayers have often been used to foster a microstructure in a Cobalt-based magnetic layer with high coercivity and low noise. Underlayers of other materials have also been tried, such as NiAl, Mo, W, Ti, NiP, CrV and Cr alloyed with other substitional elements. However, only a few of the underlayers actually perform well, and the most successful underlayer has been pure chromium. The chromium underlayer can be deposited with any of several types of consistent crystalline structure, and most often is deposited with a BCC structure. It is believed that the crystalline structure of the underlayer, and particularly a BCC structure of a Cr underlayer, promotes grain-to-grain epitaxial growth of the HCP microstructure of cobalt-based thin films, thereby providing a magnetic layer with beneficial magnetic properties.

Another parameter affecting storage density is head to media spacing. A decrease in head to media spacing allows increased storage density. Present flying altitudes of magnetic head assemblies over the disc surface are usually in the 100–500 Angstrom range. Still lower flying altitudes are anticipated in the future. As flying altitudes are decreased however, the tribology between the slider and disc surface becomes more and more important.

Yet another parameter affecting storage density is the width or minimum separation between adjacent tracks on the disc. Track spacing is dependant upon the minimum size of recorded transitions, and also is dependant upon cross-talk from adjacent tracks. Each track must be readable by the magnetic head assembly without interference or cross-talk from adjacent tracks. Each track must also be able retain its recorded information without alteration during writing of adjacent tracks. Present track spacing of commercially available discs is in the range of 5,000 to 10,000 tracks per radial inch, e.g., each track has a width of about 2.5 to 5 microns (25,000 to 50,000 Angstroms).

As storage density is increased, noise in the signal output from the media becomes more problematic. Excessive noise must be avoided to reliably maintain integrity of the stored information. One cause of media noise is cross-talk due to the magnetic field created by adjacent locations on the disc. The magnetic field of each magnetized location on the disc is strongest directly over that disc location, but also emanates outwardly from that disc location in all directions. The magnetic field sensed by a read transducer thus includes not only effects from the magnetization of the disc location directly under the read transducer, but also effects from the magnetization of other adjacent locations. When a read transducer is centered over a track, the tracks are adequately spaced for the head to medium spacing, and the magnetic medium supports sharp transitions, then the track directly underneath the read transducer will dominate the sensed magnetic field, and cross-talk will be minimal. If the read transducer is not centered over the track where the information was written, the distance to the track being read is larger and the distance to adjacent tracks is smaller. Accordingly, inaccurate centering will cause an increase in cross-talk. Similarly, as track spacing decreases, adjacent tracks contribute a greater and greater portion to the sensed magnetic field, and cross-talk increases.

The disc drive must be able to differentiate between tracks on the disc and to center the magnetic head over any particular track. Most disc drives use embedded "servo patterns" of recorded information on the disc. The servo patterns are read by the magnetic head assembly to inform the disc drive of track location. Tracks typically include both data sectors and servo patterns. Each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is somewhat of a time consuming process.

One approach to reduce cross-talk while maintaining increased storage density has been to permanently define tracks by injection molding or stamping a track pattern on a plastic substrate disc. The track pattern includes mechanical voids or depressions in the magnetic layer between tracks. The stamped pattern also includes depressions for servo patterns. The magnetic material layer is then applied at a consistent thickness over the entire disc surface.

After the disc is mechanically fabricated, the servo patterns must be magnetically initialized so they may be magnetically sensed. The entire disc is magnetically initialized with a unidirectional DC magnetic bias. The resulting disc produces a difference in signal intensity in the servo patterns between the relatively strong signal received from the protrusions to the significantly weaker signal received from the depressions.

When this type of disc is used, the distance from the magnetic head to magnetic material in the depressions is further than the distance from the magnetic head to magnetic material in the track. The increased distance both reduces the strength of the signal recorded in the depressions and reduces the contribution from the depressions to the magnetic field sensed by the read head. The depressions accordingly create a barrier between tracks to reduce cross-talk, and higher track density can theoretically be achieved. This approach, referred to as a PERM disc, is being marketed by Sony Corp. The depressions used have a depth of about 0.2 microns (2000 Angstroms) and a width of about 0.2 microns, and track densities of 20,000 tracks per inch (e.g. track widths of 1.25 microns) are reported as being possible.

While the depressions stamped in the disc are helpful in increasing track density, they have a detrimental effect on the tribology of the air bearing slider. The slider no longer travels over a smooth surface, causing several mechanical performance drawbacks. The drawbacks include modulation of fly height when encountering servo patterns, fly height perturbations due to topography changes from the track width definition, glide defects from the stamping process, and disc distortion due to lack of rigidity and yield strength of the plastic substrate material. Other methods to increase track density without the mechanical performance penalties of the Perm disc are needed.

SUMMARY OF THE INVENTION

The present invention is a magnetic medium with permanently defined boundaries between tracks but with a consistent surface smoothness. The magnetic medium includes a substrate, an underlayer and a magnetic thin film layer. In one embodiment, the crystallographic structure of the magnetic layer or the underlayer is modified at the track boundaries, so the track boundaries take on a relatively non-magnetic structure as compared to the grains of the magnetic thin film within the tracks. Modification of the crystallographic structure can be achieved through any of several laser treatments photolithographic or other types of processes. Servo patterns on the magnetic medium may be permanently defined at the same time the track boundaries are permanently defined.

DETAILED DESCRIPTION OF THE PREFERRED EMBODIMENTS

Figure 1:
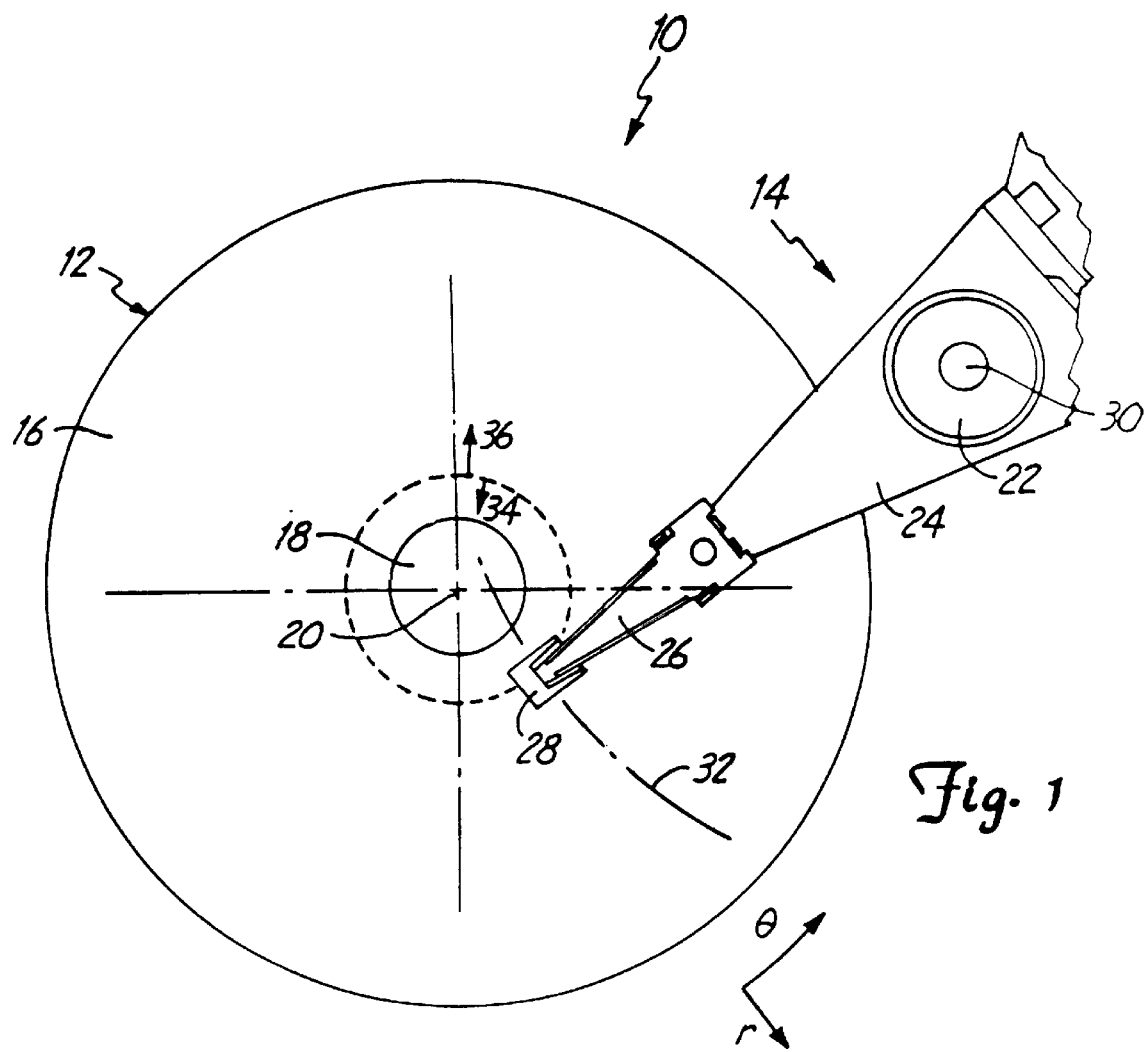
FIG. 1 is a top plan view of a computer disc drive.
Figure 2:
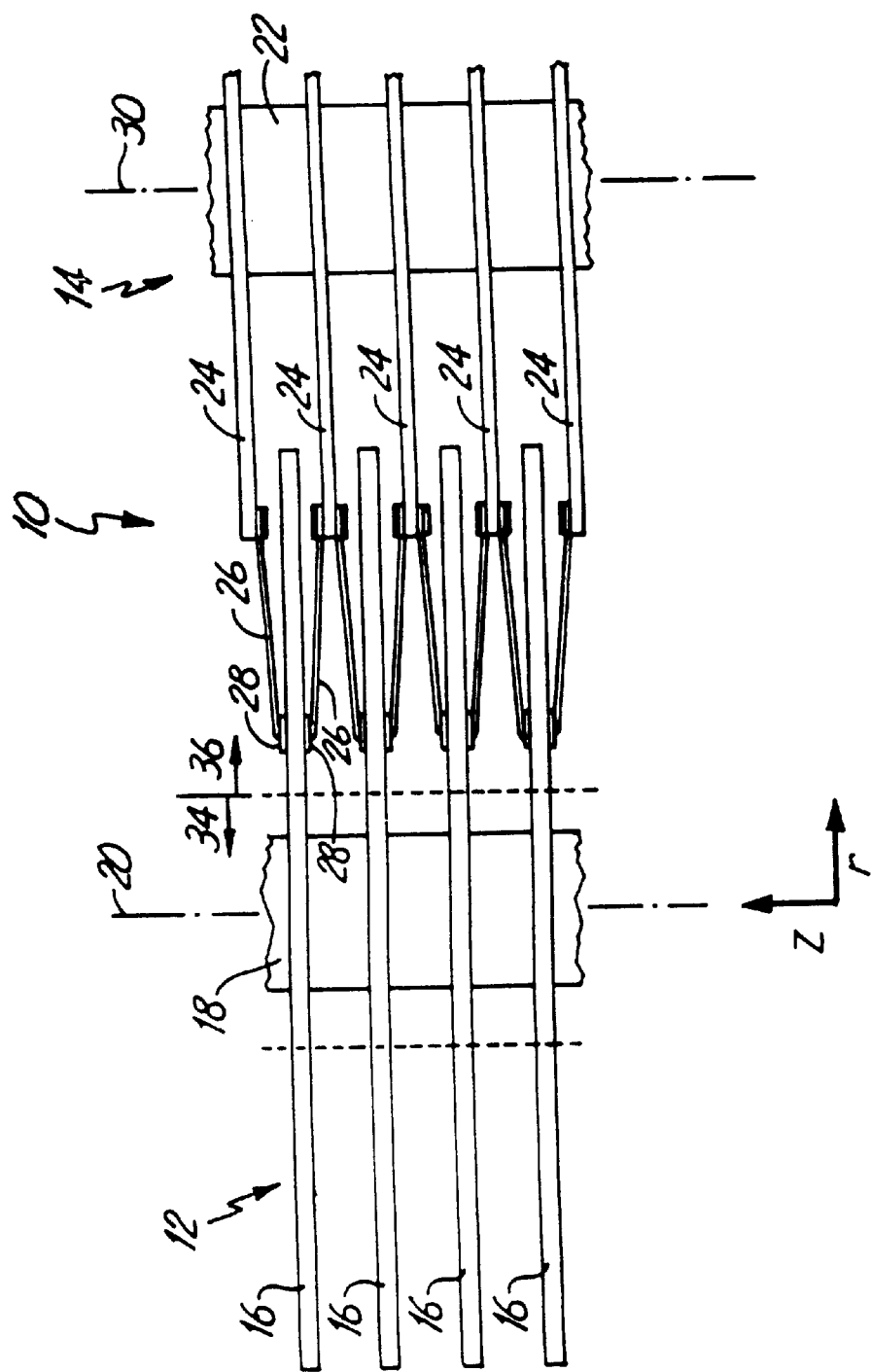
FIG. 2 is a side view of the computer disc drive of FIG. 1.

FIGS. 1 and 2 represent a disc drive structure 10. Disc drive assembly 10 includes disc pack 12 and E-block assembly 14. Disc pack 12 includes discs 16 stacked on drive spindle 18. During use of the disc drive 10, drive spindle 18 rotates discs 16 about axis 20. E-block assembly 14 includes servo spindle 22 and a plurality of actuator arms 24. Each actuator arm 24 carries one or two flexure arms or suspension arms 26. Each suspension arm 26 supports an air bearing magnetic head assembly 28 adjacent a surface of a disc 16. As disc 16 rotates about drive spindle 18 at a high speed such as 10 m/s or higher relative to magnetic head assembly 28, the aerodynamic properties of magnetic head assembly 28 cause assembly 28 to "fly" above the surface of disc 16. The flying height of magnetic head assembly 28 above disc 16 is a function of the speed of rotation of disc 16, the surface topography of disc 16, the aerodynamic lift of the slider of magnetic head assembly 28, and the spring tension in suspension arm 26.

E-block assembly 14 is pivotable about pivot axis 30. As E-block assembly 14 pivots, each magnetic head assembly 28 mounted at the tip of its suspension arm 26 swings through arc 32. As each disc 16 rotates beneath its respective magnetic head 28, this pivoting motion allows the magnetic head assembly 28 to change track positions on its disc 16. Each disc 16 has a landing zone 34 where the magnetic head assembly 28 lands, rests while the disc drive 10 is off, and takes off from when the disc drive 10 is started up. Each disc 16 has a data zone 36 where the magnetic head assembly 28 flies over the disc 16 and magnetically stores data.

A prior art magnetic medium 38 for disc 16 is illustrated in more detail in FIGS. 34. Magnetic medium 38 has a substrate 40 and an underlayer 42 deposited over the substrate 40. Substrate 40 is preferably a nickel-phosphorous plated aluminum disc. Substrate 40 provides the structural integrity for magnetic medium 38. Other materials, such as glass or manganese-oxide, may also be suitable for substrate 40.

Underlayer 42 is formed of a relatively non-magnetic material, such as chromium or nickel-phosphorus. Underlayer 42 is preferably 200 to 500 Angstroms thick. Underlayer 42 sets up a seeding crystallographic structure for proper crystal development in magnetic layer 44. Underlayer 42 may be applied over substrate 40 by sputtering, and various sputter chamber parameters may contribute to the effectiveness of underlayer 42. A chromium underlayer 42 can be deposited to have a BCC crystallographic structure.

Magnetic layer 44 of a magnetic material is applied over underlayer 42. Magnetic layer 44 is preferably formed of a cobalt-based alloy, such as a cobalt-chromium-tantalum alloy. The cobalt-based magnetic layer 44 has an HCP crystal structure.

Magnetic layer 44 is preferably 100 to 300 Angstroms thick. Magnetic layer 44 may be applied over underlayer 42 by sputtering, and various sputter chamber parameters may contribute to the effectiveness of magnetic layer 44.

Overcoat 46 is deposited over magnetic layer 44. Overcoat 46 enhances the durability and wear resistance of the magnetic media 38. Overcoat 46 preferably is a layer of sputtered amorphous carbon from about 100 to 150 Angstroms thick. Other materials which may be suitable for overcoats include sputtered ceramic zirconium oxide and amorphous films of silicon dioxide. Any of the substrate 40, the underlayer 42 or the overcoat 46 may be textured as desired for beneficially affecting the tribology of the particular disc drive system.

A lubricant layer 48 overlies overcoat 46. Lubricant layer 48 further reduces wear of the magnetic media 38 due to contact with the magnetic read-write head assembly 28. The lubricant 48 is preferably a PFPE-based lubricant having a thickness of 10 to 50 Angstroms. Overcoat 46 and lubricant 48, while not performing a magnetic function, greatly affect the tribology, wear and corrosion in the disc drive system 10.

Prior art magnetic medium 38, as constructed, is homogeneous in the radial direction r and the circumferential direction θ. After construction, information is magnetically recorded on magnetic medium 38, as represented in FIGS. 3 and 4 by + and − magnetization signs 50, 52, respectively, together with magnetic flux arrows 54.

During manufacture of the disc drive 10, servo patterns 56 (shown in FIG. 3) are magnetically written on magnetic medium 38. Servo patterns 56 include a plurality of servo bursts 58 which are precisely located on magnetic medium 38 both in the radial and circumferential directions. Servo patterns 56 define the radial location of concentric tracks 60a, 60b, 60c, 60d, which are shown separated by imaginary track boundaries 62. Servo patterns 56 contain indexing information to index each track 60 of the disc. Servo patterns 56 also contain centering information to center the magnetic head assembly 28 with respect to a particular track 60. The indexing and centering information of servo patterns 56 is used by disc drive 10 to precisely position magnetic head assembly 28 in the radial direction with respect to disc 16.

During use of the disc drive 10, data is magnetically written on magnetic medium 38 in data portions 64 of tracks 60. As shown by magnetization signs 50, 52, data is recorded on tracks 60 by oppositely magnetizing locations within tracks 60. Data is then read from magnetic medium 38 by sensing the alternating direction of magnetic flux. No data has yet been written on track 60d, and hence track 60d is depicted without + and − magnetization signs 50, 52.

Figure 3:
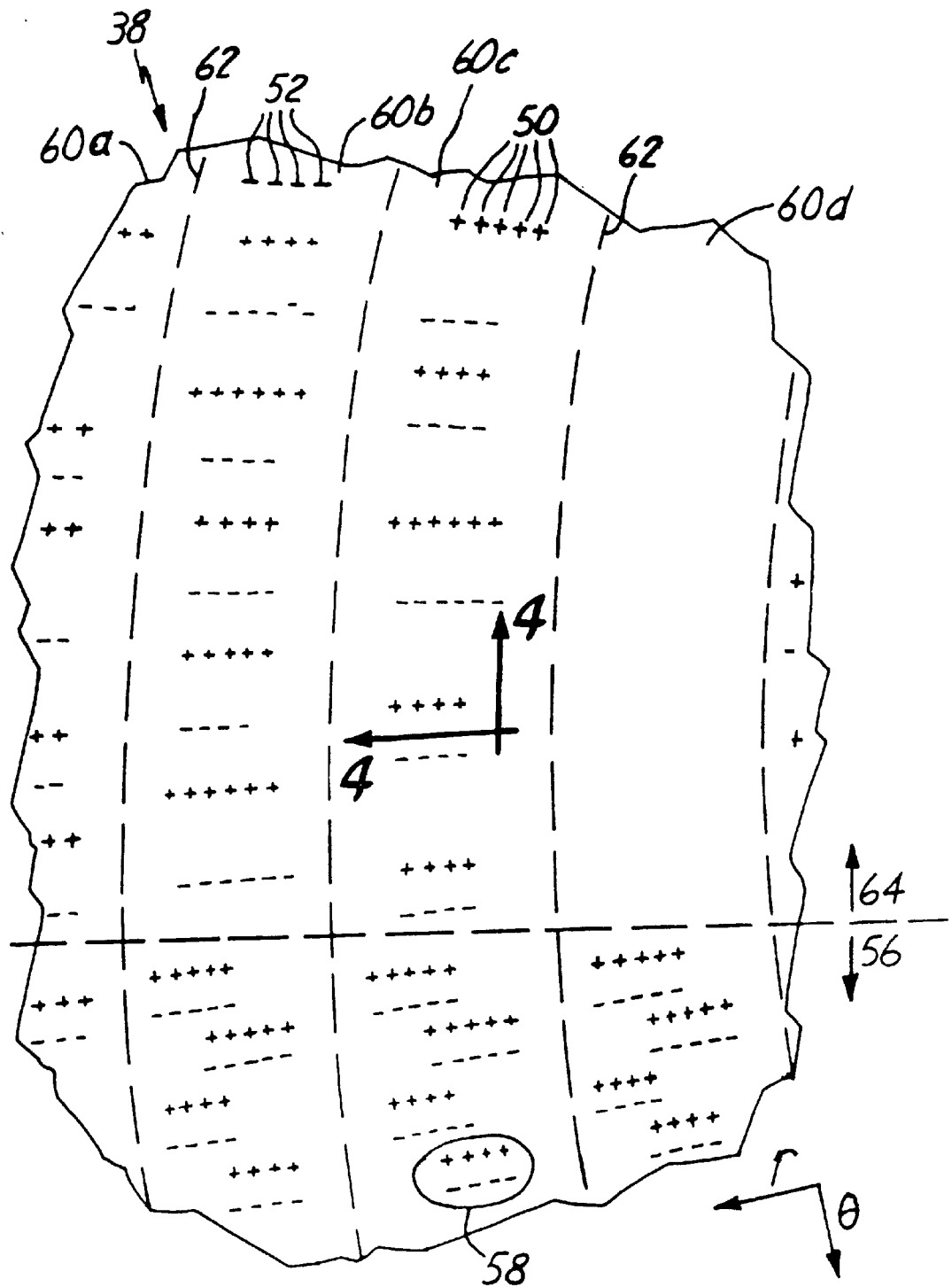
FIG. 3 is a greatly enlarged top plan view of a portion a prior art thin film magnetic disc, schematically showing magnetic flux.
Figure 4:
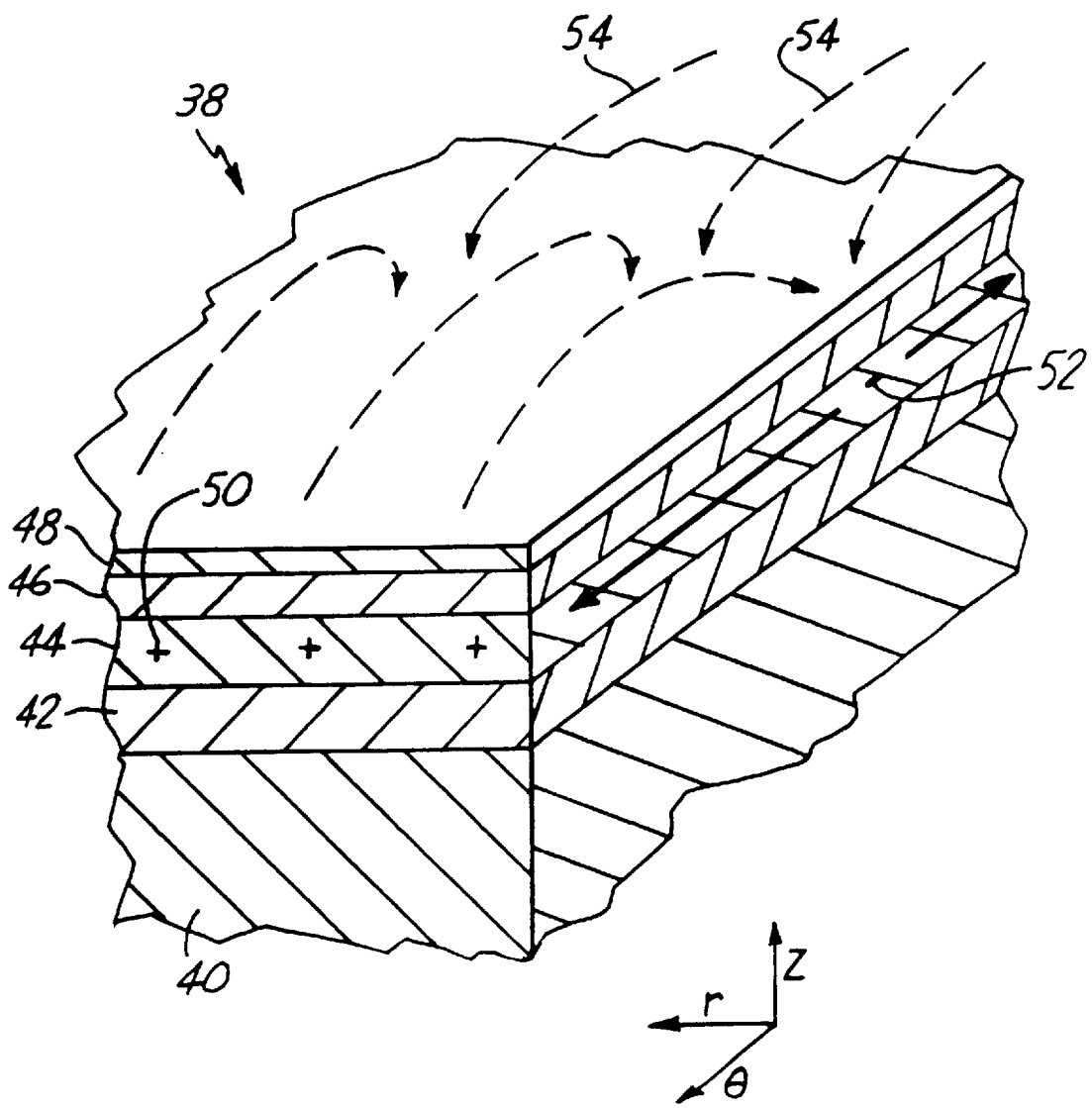
FIG. 4 is a cross-sectional perspective view of a portion of the prior art thin film magnetic disc of FIG. 3 taken along line 4—4.

Tracks 60a–60d include significant radial spacing between recorded magnetization signs 50, 52 shown in FIG. 3 as the blank area around track boundaries 62. This radial spacing is necessary to allow servo patterns 56 to define separate tracks 60 and to avoid side-writing and cross-talk problems associated with information recorded on adjacent tracks.

The radial extent of each recorded transition 50, 52 varies slightly between transitions, shown in FIG. 3 as a variance in the number of magnetization signs 50, 52 (from four to six per signal). This radial variation occurs due to a number of factors which cannot be precisely controlled, such as modulating fly height, slight imperfections in the crystallographic structure of the disc, etc. Also, each of the recorded transitions may not be exactly centered in the track 60, known as side writing. Side writing occurs when the write head is not in the proper radial position to be centered over the track 60 during writing. Side-writing can also occur due to a number of different factors, including improper positioning and small overshoot vibrations of the actuator arm 24.

Figure 5:
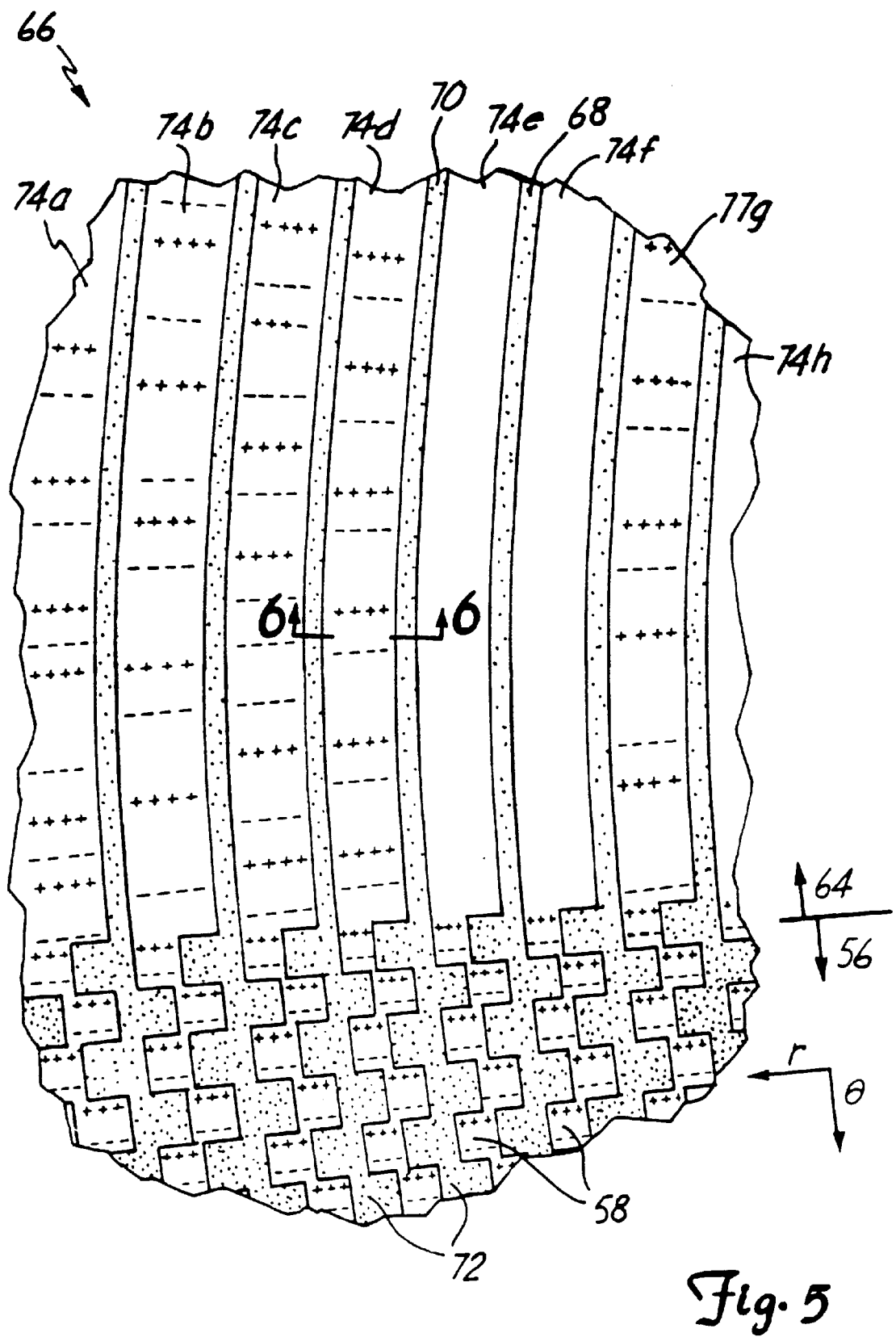
FIG. 5 is a greatly enlarged top plan view of the magnetic medium of the present invention, schematically showing magnetic flux.
Figure 6:
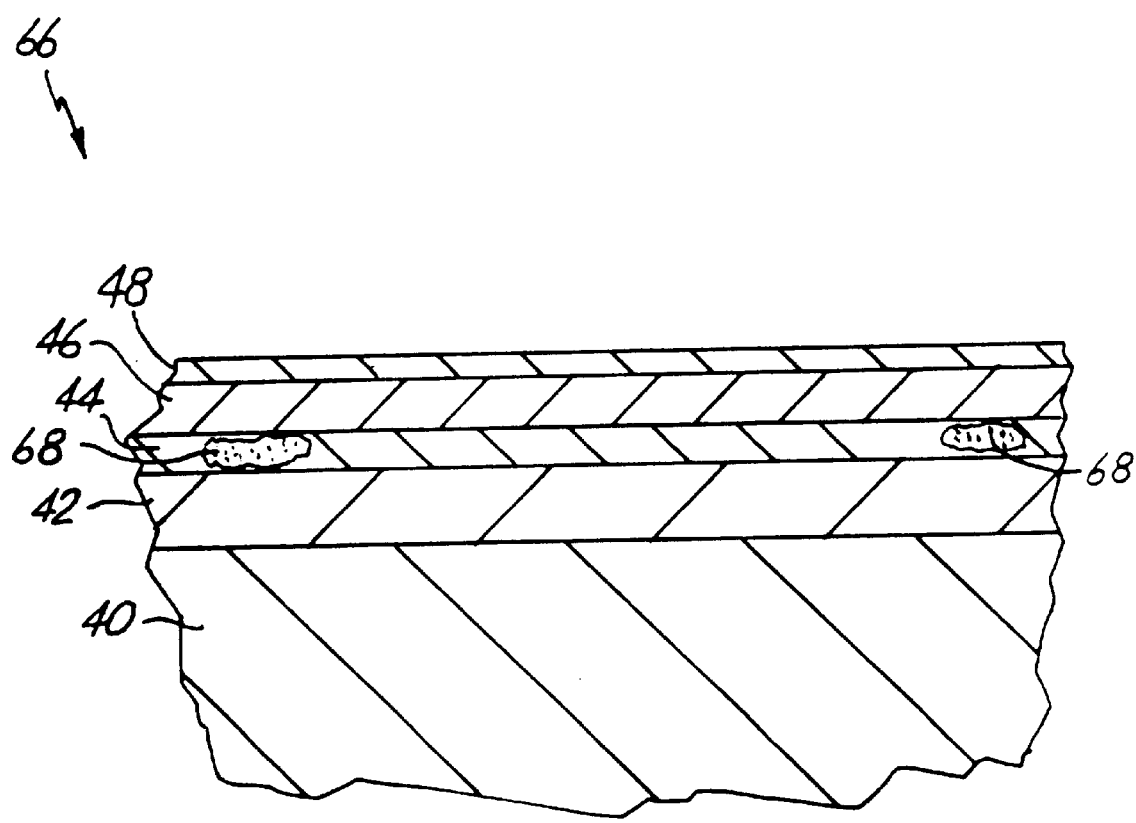
FIG. 6 is a cross-sectional view of a portion the magnetic medium of FIG. 5, taken along line 6—6.

The magnetic medium 66 of the present invention is depicted in FIGS. 5 and 6. Magnetic medium 66 has a substrate 40, underlayer 42, magnetic layer 44, overcoat 46 and lubricant layer 48 all similar to magnetic medium 34.

However, magnetic medium 66 has permanently defined relatively non-magnetic areas 68. The permanently defined non-magnetic areas 68 include track boundaries 70 and servo negatives 72. Track boundaries 70 do not support a magnetic signal, and the radial width of the recorded signal pattern is accordingly consistently equal to the width of the tracks 74a–74h. With the consistent radial width of the recorded signal and consistent spacing between adjacent tracks, side-writing and cross-talk between tracks 74a–74h is reduced. Tracks 74a–74h can accordingly be spaced more closely together than the prior art tracks 60a–60d. No data has yet been written on tracks 74e and 74f, and hence tracks 74e and 74f are depicted without + and − magnetization signs 50, 52.

Servo bursts 58 in servo patterns 56 are written between servo negatives 72. Servo negatives 72 define both the radial and circumferential boundaries between servo bursts 58. With the boundaries of servo bursts 58 pre-defined, placing the magnetic pattern on servo patterns 56 becomes much easier, less time-consuming, and less expensive.

Several laser or chemical treatment processes are contemplated for producing non-magnetic areas 68. Several of these processes are used to alter the composition or crystal structure, which is schematically shown in FIG. 6. Others of these processes change the size or remove non-magnetic areas 68 from the magnetic layer 44, or affect the underlayer 42. Workers skilled in the art will appreciate that these other processes produce a slightly different cross section than that shown in FIG. 6.

As a first alternative, a laser may be used to produce a high temperature localized within non-magnetic areas 68. For instance, laser heating to raise the local temperature of the magnetic layer 44 to a temperature above the melting temperature of the magnetic alloy (approx. 800° C. for most magnetic layers 44), performed under proper conditions, can cause the magnetic layer 44 to ablate in the specific location that is heated. The ablation process must be performed after deposition of the magnetic layer 44 but before deposition of the overcoat 46. One problem with the ablation process is that it is relatively "dirty", and care must be taken to assure that the ablated magnetic layer molecules do not redeposit on other regions of the disc. Ablation in the presence of a chemical assist or flow gas helps to avoid problems after ablation. For instance, an oxygen ($O_2$) flow gas may be used, such that the ablated cobalt based alloy of the magnetic layer 44 is captured through oxidation reduction. A second problem with the ablation process is that it leads to a surface of the magnetic layer 44 which is not entirely smooth and flat. If the depressions in the magnetic layer 44 are substantial and no steps are taken to fill or otherwise address the smoothness of these depressions, flyability problems may result.

As a second alternative, a laser heating process can be used to heat the magnetic layer 44 to a high temperature below the melting temperature of the magnetic layer alloy. This type of heating causes damage to the crystalline structure of the magnetic alloy, so it no longer exhibits the same magnetic properties within the non-magnetic areas 68. The previous crystalline structure can be transformed into an amorphous state which is very non-magnetic compared to the originally deposited crystalline structure of the magnetic layer 44. For most cobalt-based magnetic layers 44, a localized temperature in the 300 to 800° C. range is appropriate to transform the crystalline structure. One benefit with the amorphous transformation is that it is much cleaner than the ablation process. A second benefit is that the amorphous transformation can be performed either before or after the overcoat 46 is deposited. Laser heating can be achieved at a wavelength at which the carbon overcoat 46 is relatively transparent, thus heating the magnetic layer 44 in a very localized manner even after the overcoat 46 has been applied.

A problem with both laser heating processes is the uncontrolled transfer of heat within the magnetic layer 44 due to heat conduction. The application of heat must be kept very localized within the boundaries of the laser to achieve sharp boundaries of non-magnetic areas 68. Pulsing the laser, such as with 20 nanosecond pulses with about 10 μs between pulses, aids in limiting heat dispersion greatly within magnetic layer 44. In this way, the high temperature region is retained within relatively sharp boundaries for nonmagnetic areas 68. The laser heating is preferably achieved with a short wavelength laser, such as an excimer laser, a quadrupled Nd:YAG laser (Neodymium, Yttrium, Aluminum, Garnet), an Nd:Vanadate laser (Neodymium doped with Vanadium Oxide), an Nd:YLF laser Neodymium, Yttrium, Lithium, Fluoride), or a similar laser.

A third alternative to create non-magnetic areas 68 is through a photolithographic masking process. The photolithographic process is performed after the magnetic layer 44 has been deposited and before the overcoat 46 has been deposited. A photoresist mask can be applied to protectively cover the desired magnetic areas, while leaving non-magnetic areas 68 exposed. After the mask is applied, a chemical agent is applied to render the exposed areas non-magnetic. For instance, the disc with photoresist mask can be placed in a highly oxidizing environment in an oven heated to 200 to 300° C., thereby oxidizing the magnetic alloy of magnetic layer 44 at the non-magnetic areas 68. After the chemical agent acts on non-magnetic areas 68, the photoresist mask is removed, and fabrication of the disc continues with deposition of the overcoat 46. One problem which may occur during this photolithographic creation of non-magnetic areas 68 is that the oxidation of the magnetic layer 44 may result in volumetric expansion. Because only selected areas of the magnetic layer 44 are oxidized, the resultant surface of the magnetic layer 44 is not entirely smooth and flat. Excess volumetric expansion during creation of non-magnetic areas 68 can lead to flyability problems of the disc 16.

A fourth alternative method to create non-magnetic areas 68 is through altering the easy axis of magnetization for select areas of the magnetic layer 44. Research is presently being done in the area of magnetic layer 44 deposition for perpendicular and longitudinal recording, wherein the easy axis of magnetization is "out of plane", generally perpendicular to the plane of the disc. With perpendicular techniques, the magnetic layer 44 may be deposited with the easy axis or magnetization being out-of-plane. Then any of several techniques, including the laser and photolithographic techniques discussed above and other perpendicular recording techniques, can be used to selectively alter the easy axis of magnetization to in-plane for magnetic areas. Non-magnetic areas 68 are left with the easy axis of magnetization out-of-plane, and thus are left relatively nonmagnetic when acted on by an in-plane magnetic field for initialization. With longitudinal techniques, the magnetic layer 44 is deposited with an in-plane easy axis of magnetization. Longitudinal deposition techniques can be used to selectively alter the easy axis of magnetization to out-of-plane for non-magnetic areas 68.

A fifth alternative method to create non-magnetic areas 68 is through altering the crystallographic structure of the underlayer 42, such that the underlayer 42 does not uniformly support epitaxial growth. The growth mode of the crystallographic structure of the magnetic layer 44 is believed to be dependent on the underlying underlayer 42. Provided the magnetic layer 44 is sufficiently thin, each different crystallographic structure of underlayer 42 will produce a different crystallographic structure of magnetic layer 44. Workers skilled in the art will appreciate that the underlayer 42 and the magnetic layer 44 interrelate toward the crystalline structure and magnetic properties of the magnetic thin film 66. A proper seeding microstructure of the underlayer 42 is critical for maximizing magnetic properties of the magnetic layer 44. The underlayer 42 may be selectively treated in non-magnetic areas 68 so as to no longer have a proper seeding microstructure. When the magnetic layer 44 is deposited over the underlayer 42, portions of the magnetic layer 44 over untreated areas will form a relatively magnetic crystallographic structure, while portions of the magnetic layer 44 over treated areas will form a relatively non-magnetic crystallographic structure. For instance, the laser heating and photo lithographic methods discussed above for the magnetic layer 44 could be similarly applied to the underlayer 42, to either remove the underlayer 42 at the non-magnetic areas 68 or to change the BCC structure of the underlayer 42 at the non-magnetic areas 68 to an amorphous crystalline structure. The preferred temperature range for laser heating of a chromium underlayer 42 in non-magnetic areas 68 is 300–800° C. The composition of the underlayer 42 at the boundaries may also be modified through a photolithographic process such as described above to have a different composition at non-magnetic areas 68.

Yet other methods for creating non-magnetic areas 68 are also contemplated, most of which are performed after deposition of the magnetic layer 44 and before deposition of the overcoat 46. Ion milling and reverse sputtering may be used as removal processes to selectively remove magnetic layer 44 at non-magnetic areas 68. The preferred ion milling process is through projecting a beam of argon ions onto the non-magnetic areas 68. "Reverse sputtering", wherein the disc is biased oppositely as compared to the sputtering process used in deposition of magnetic layer 44, can also be used to selectively remove magnetic layer 44 over non-magnetic areas 68. A chemically assisted etching process, a photolithographic masking process, or other process must be used with the reverse sputtering so that material is removed only from non-magnetic areas 68 and not from magnetic areas. Ion implantation can be used to selectively destroy the crystallographic grain structure in non-magnetic areas 68. The preferred ions for implantation include any of oxygen, nitrogen and silicon. Numerous of the techniques herein discussed can be performed during the deposition of the magnetic layer 44 to have a more beneficial effect. Additionally, two or more of the techniques herein discussed may be used in combination to permanently define non-magnetic areas 68.

Workers skilled in the art will appreciate that non-magnetic areas 68 may either be entirely non-magnetic or may only be relatively non-magnetic compared to the remaining areas of magnetic layer 44. For instance, the relatively magnetically non-responsive locations 68 on the magnetic layer 44 may have a significantly lower coercivity and $b_r t$ than the magnetically responsive locations, such that the magnetically non-responsive locations 68 do not significantly contribute to the field strength sensed by the magnetic read head. The relatively magnetically non-responsive locations 68 on the magnetic layer 44 may alternatively have a constant magnetization which is unaltered by the write field, and be used with a magneto-resistive (MR) read head. Because an MR head senses changes in magnetism, a constant magnetic field produced by magnetically non-responsive locations 68 will not affect the signal of the sensed transitions in the active areas of magnetic layer 44.

Depending upon the method chosen for creating non-magnetic areas 68, a magnetic initialization process may be required. For instance, a large magnetic field may be used to commonly magnetize the servo-bursts 58 with a unidirectional DC magnetic bias. The sensed magnetic transitions for the servo-patterns 56 are between the magnetic signal of the servo-bursts 58 and the relative lack of a magnetic signal from the non-magnetic areas 68. Workers skilled in the art will appreciate that the parameters of any magnetic initialization process are chosen based upon the method of fabrication and the magnetic properties of the resultant disc.

If the method chosen for creating non-magnetic areas 68 leaves some level of magnetism at non-magnetic areas (albeit a different level or orientation of magnetism as compared to servo-bursts 58), a two step magnetic initialization process may be useful. For instance, a two step magnetic initialization process may be useful if the perpendicular or longitudinal methods are used to differentiate between servo-bursts 58 and non-magnetic areas 68. In one step, the out-of-plane oriented domains are magnetically initialized with a first magnetic field. In the other step, the in-plane oriented domains are magnetically initialized with a second magnetic field which is oriented to have little effect on the out-of-plane oriented domains. Again the parameters of any magnetic initialization process are chosen based upon the method of fabrication and the magnetic properties of the resultant disc to produce consistently sharp, high magnitude magnetic transitions between the servo-bursts 58 and the servo-negatives 72.

Although the present invention has been described with reference to preferred embodiments, workers skilled in the art will recognize that changes may be made in form and detail without departing from the spirit and scope of the invention.

What is claimed is:

1. A magnetic medium comprising:

a substrate; and means for magnetically storing information including one of track definitions and servo-patterns, said means deposited over the substrate.

2. A magnetic medium comprising:

a substrate;

an underlayer over the substrate;

a magnetic layer over the underlayer, the magnetic layer formed a magnetic material, wherein select locations of the magnetic layer have a relatively non-magnetic crystallographic structure so as to permanently define servo-patterns on the magnetic medium, wherein the magnetic layer is a magnetic thin film.

3. The magnetic medium of claim 3, wherein the magnetic layer has a homogeneous composition.

4. The magnetic medium of claim 2, wherein the magnetic medium is a disc which defines a plane, and wherein the non-magnetic crystallographic structure has an easy axis of magnetization which is out-of-plane.

5. A magnetic medium comprising:

a substrate having a relatively smooth surface profile;

an underlayer over the substrate, the underlayer formed of a non-magnetic material and having a crystallographic structure;

a magnetic layer over the underlayer, the magnetic layer formed of a magnetic material with magnetic properties which vary based on the crystallographic structure of the underlayer, wherein features of the magnetic layer which are generally magnetically responsive are permanently defined between generally non-magnetic areas.

6. The magnetic medium of claim 5, wherein the substrate is nickel-phosphorus plated aluminum, the underlayer is chromium, and the magnetic layer is a cobalt-based alloy.

7. The magnetic medium of claim 5, further comprising:

an overcoat over the magnetic layer; and a lubricant layer over the overcoat.

8. The magnetic medium of claim 5, wherein the generally non-magnetic areas are formed in locations where the underlayer is removed.

9. The magnetic medium of claim 5, wherein the underlayer has first portions with a first crystallographic structure and second portions with a second crystallographic structure, wherein the features of the magnetic layer which are generally magnetically responsive are over the first portions of the underlayer and wherein the generally non-magnetic areas are over the second portions of the underlayer.

10. The magnetic medium of claim 5, wherein the magnetic layer is a magnetic thin film with a homogeneous composition.

11. The magnetic medium of claim 5, wherein the magnetically responsive features are servo-bursts.

12. The magnetic medium of claim 5, wherein the magnetically responsive features are tracks.

13. The magnetic medium of claim 12, wherein the underlayer has a relatively smooth surface profile over the substrate, and wherein the magnetic material of the magnetic layer is removed at the boundaries.

14. The magnetic medium of claim 12, wherein the underlayer has a relatively smooth surface profile over the substrate, wherein the magnetic material of the magnetic layer at the tracks has an HCP crystalline structure, and wherein the magnetic material of the magnetic layer at the boundaries has an amorphous crystalline structure.

15. The magnetic medium of claim 12, wherein the magnetic medium is a disc which defines a plane, and wherein the magnetic layer at the tracks has a first crystallographic structure with an easy axis of magnetization which is in-plane, and wherein the magnetic layer at the boundaries has a second crystallographic structure with an easy axis of magnetization which is out-of-plane.

16. The magnetic medium of claim 12, wherein the non-magnetic material of the underlayer is removed at the boundaries.

17. The magnetic medium of claim 12, wherein the underlayer has a first crystallographic structure at the tracks and has a second crystallographic structure at the boundaries.

18. The magnetic medium of claim 17, wherein the first crystallographic structure is a BCC structure, and wherein the second crystallographic structure is an amorphous structure.

19. The magnetic medium of claim 17, wherein the second crystallographic structure is chemically modified to have a composition which differs from that of the first crystallographic structure.

* * * * *

UNITED STATES PATENT AND TRADEMARK OFFICE
CERTIFICATE OF CORRECTION

PATENT NO. : 6,153,281　　　　　　　　　　　　　　　　　　　Page 1 of 1
DATED : November 28, 2000
INVENTOR(S) : Dallas W. Meyer et al.

It is certified that error appears in the above-identified patent and that said Letters Patent is hereby corrected as shown below:

Column 10,
Line 57, delete "3", insert -- 2 --
Line 60, after "wherein the", insert -- relatively --
Line 66, before "non-magnetic", insert -- relatively --

Column 12,
Line 16, after "wherein the ", insert -- relatively --

Signed and Sealed this

First Day of January, 2002

Attest:

JAMES E. ROGAN
*Attesting Officer*　　　　*Director of the United States Patent and Trademark Office*